UNITED STATES PATENT OFFICE.

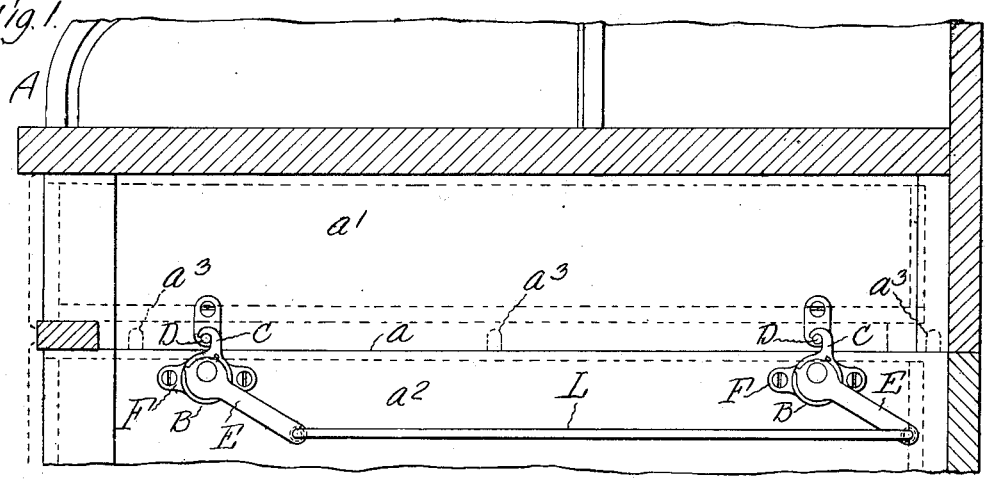
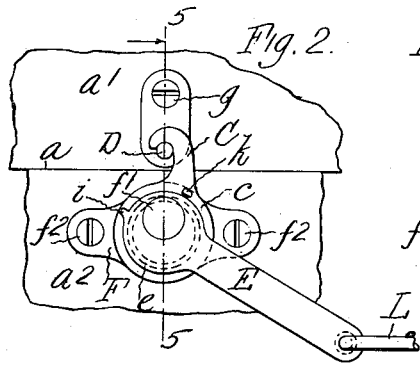
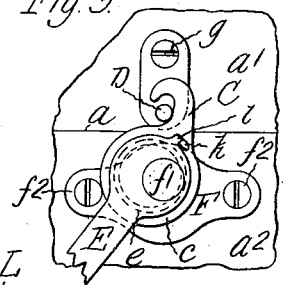
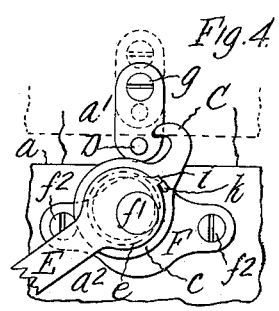
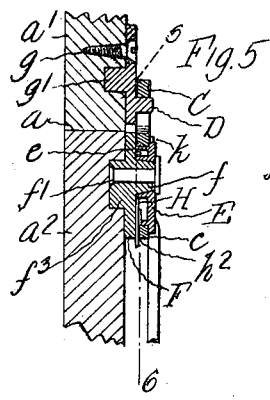
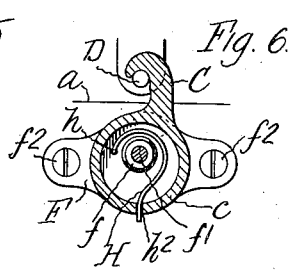
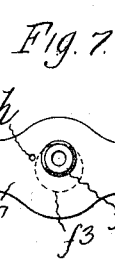
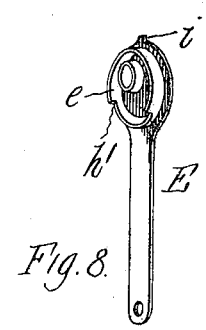
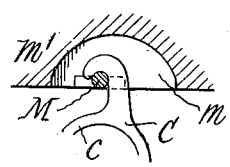
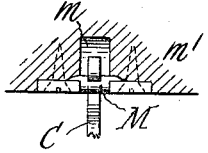

JACOB BODENSTEIN, OF HERKIMER, NEW YORK.

LATCH MECHANISM FOR FURNITURE.

1,160,105.   Specification of Letters Patent.   Patented Nov. 9, 1915.

Application filed January 22, 1915. Serial No. 3,826.

*To all whom it may concern:*

Be it known that I, JACOB BODENSTEIN, a citizen of the United States, residing at Herkimer, in the county of Herkimer and State of New York, have invented a new and useful Improvement in Latch Mechanism for Furniture, of which the following is a specification.

This invention relates more particularly to improvements in connecting or securing devices which are adapted for use on desks and other articles of furniture for rigidly but detachably connecting the separable parts thereof.

One object of the invention is to provide desirable and practical means whereby two parts, such as the separable portions or sections of a desk or the like, can be connected so as to draw them tightly together and hold them securely together, but which enable the sections to be quickly and easily disconnected and separated without necessitating the use of tools. The connecting means hereinafter described enable an article, such as a large roll-top desk, to be made in separable upper and lower sections which are held rigidly and securely together as if connected by screws or other permanent fastenings, but can be readily disconnected by a simple manipulation of the connecting devices and separated when this is necessary for any reason, as for carrying the desk through a doorway or for shipment.

Another object of the invention is to produce a connecting or securing device of simple, strong and durable construction which can be readily applied and easily operated to connect and disconnect the parts to which it is applied.

In the accompanying drawings: Figure 1 is a fragmentary sectional elevation of a desk provided with means embodying the invention for connecting the separable sections thereof. Figs. 2 and 3 are enlarged elevations of one of the securing devices, showing respectively the locked and released positions of its parts. Fig. 4 is a similar view thereof showing the catch or hook moved to clear the coöperating member. Fig. 5 is a sectional elevation thereof on line 5—5, Fig. 2. Fig. 6 is a sectional elevation thereof in line 6—6, Fig. 5. Fig. 7 is a detached elevation of the base plate of the device. Fig. 8 is a detached perspective of the eccentric lever of the device. Fig. 9 is a sectional elevation showing a different form of keeper. Fig. 10 is a transverse sectional elevation thereof.

Referring first to the construction shown in Figs. 1–8 of the drawings, A represents a desk which is divided horizontally on the line $a$ into separate upper and lower parts or sections $a'$ and $a^2$. The sections of the desk are properly positioned, one on the other, and prevented from shifting horizontally relative to each other by suitable means, such as the usual dowel pins $a^3$ on one section entering registering holes in the other section, and the two desk sections are drawn tightly together and secured in place by the connecting or securing devices. B represents the securing devices which are located at suitable points within the outer walls of the desk, where they are hidden from view but are readily accessible. Preferably two of the securing devices B are provided on the inside of each side wall of the desk respectively near the front and rear portions thereof, where the front devices can be readily reached through drawer openings of the desk when the drawers are removed. Each of the securing devices, which are alike, comprises a hook or catch C pivotally mounted on one desk section $a^2$ and adapted to engage a stud or keeper D on the other desk section $a'$, and an eccentric lever E by which the catch is moved to engage and disengage the stud or keeper and draw the two sections of the desk together, and which is pivoted on a base plate F fixed to the desk section $a^2$. The hook C has a ring or portion $c$ with a circular opening which surrounds and is adapted to turn on an eccentric boss or flange $e$ on one side of the lever E, the catch being retained on the eccentric between the outer face of the base plate F and the face of the lever E which projects beyond the periphery of the eccentric. As shown, the eccentric lever swings on a tapering pivot stud $f$ integral with the base plate, on which it is retained by a rivet $f'$. This affords a strong pivotal connection which will not readily work loose, but the lever could be pivotally connected to the base plate in any other suitable way. The base plate is secured to the wall of the desk section $a^2$ by screws $f^2$ or other suitable fastenings and preferably has a circular projection $f^3$ seated in a corresponding recess in the desk wall for preventing the screws from being pulled loose by the strain produced by the eccentric in drawing together the desk sections. The stud or keeper D, shown in Figs. 1–6, is secured on the inner face of the side wall of the desk section a' by a screw g and is also preferably provided with a similar projection g' seated in a recess in the wall of the desk to prevent its securing screw from being pulled loose. H represents a spring connecting the hook or catch C and the base plate F and tending to swing the catch on the eccentric e into engagement with the stud or keeper D. The spring shown consists of a bent spring wire located between the eccentric lever E and the base plate F in the space surrounded by the eccentric flange e, with one end secured in a hole h in the base plate and the other end passing through a notch h' in the eccentric flange e and entering a notch or hole h² in the ring c of the catch. When the eccentric lever E is swung in one direction, that is, to the left in the arrangement of the device shown in Figs. 1–4, the spring H will hold the hook against the stud or keeper D and the eccentric e will turn in the bearing hole of the catch and shift the catch endwise without swinging the hooked end thereof out of contact with the stud or keeper. When the eccentric lever has been thus swung far enough for the hooked end of the catch to clear the stud, as shown in Fig. 3, a shoulder or projection i on the lever engages a shoulder or projection k on the catch and causes the catch to swing away from the stud or keeper in the further movement of the eccentric lever in the same direction. The catch is thus swung to a position, shown in Fig. 4, such as to permit the stud or keeper to pass the hooked end of the catch when lifting the upper section of the desk off of the lower section. To secure the desk sections together, the eccentric lever is swung in the opposite direction and the spring H will cause the catch to swing with the lever until the shank of the hook engages the stud or keeper D. The further movement of the lever will then cause the eccentric e to turn in the bearing opening of the catch and draw the catch endwise against the stud or keeper, thereby drawing the upper section of the desk down firmly onto the lower section and firmly securing the parts. In the secured position the eccentric e occupies a substantially dead center position, see Figs. 1 and 2, and thus locks the catch and prevents the releasing movement thereof. L represents a rod or link connecting the eccentric levers of the front and rear securing device at one side of the desk, so that when the front device, which can be readily reached, is actuated the rear device will be simultaneously and correspondingly operated.

Figs. 9 and 10 show a keeper M, for the engagement of the catch C, of a construction adapting it to be secured on the underside of a wall or part, such as the top of a desk, which extends at right angles to the wall on which the catch is mounted. This keeper consists of a bar which bridges a recess m in the wall or top m' in which the hooked end of the catch is adapted to move into and out of engagement with the keeper.

A keeper of either the construction shown in Figs. 1–5 or that shown in Figs. 9 and 10, or of other construction, can be used with the securing device described, depending upon the relation of the parts to be connected.

I claim as my invention:

1. A device for drawing together and securing two parts, comprising a keeper attached to one of said parts, a base plate attached to said other part, a lever pivoted on said base plate to swing parallel thereto, a catch which is confined between said base plate and said lever and turns on a circular bearing on said lever eccentric to the lever pivot, and a spring inclosed by said lever and connected to said catch and to said base plate for swinging the catch toward said keeper, said lever being adapted to turn relative to the catch for drawing together the parts to which the catch and keeper are attached, and said lever having a part adapted to engage a part on said catch for swinging the catch in opposition to said spring.

2. A device for drawing together and securing two parts, comprising a keeper attached to one of said parts, a base plate attached to said other part, and having a pivot stud projecting from the face thereof, a lever pivoted on said stud to swing parallel with said base plate and having a circular flange on its inner face eccentric to said stud, a catch which is confined between said base plate and said lever and turns on said eccentric flange of the lever, and a spring surrounding said stud inside of said lever flange and connected to said catch and said base plate for swinging the catch toward said keeper, said lever being adapted to turn relative to the catch for drawing together the parts to which the catch and keeper are attached, and said lever having a part adapted to engage a part on said catch for swinging the catch in opposition to said spring.

Witness my hand, this 19th day of January, 1915.

JACOB BODENSTEIN.

Witnesses:
F. A. TINKER,
WM. O. RICHARD.